FIP8102 XR 3,422,222 CROSS REFERENCE SEARCH ROOM
X5220E BS

DATA LINK ERROR COMPENSATION APPARATUS

Filed April 9, 1965

INVENTOR.
JOHN B. LORD
BY Bruce C. Lutz
ATTORNEY

3422222

Jan. 14, 1969 J. B. LORD 3,422,222

DATA LINK ERROR COMPENSATION APPARATUS

Filed April 9, 1965 Sheet 2 of 2

INVENTOR
JOHN B. LORD
BY
ATTORNEY 3,422,222

DATA LINK ERROR COMPENSATION APPARATUS

John B. Lord, Edmonds, Wash., assignor to Honeywell Inc., Minneapolis, Minn., a corporation of Delaware Filed Apr. 9, 1965, Ser. No. 446,963

U.S. Cl. 178—69 5 Claims

Int. Cl. H04l *25/02;* H04b *3/46;* H04b *1/00*

ABSTRACT OF THE DISCLOSURE

A circuit and technique for providing equalization at the receiving end of a data link so that an "inverse filter" is produced which reverses the irregularities produced by the data link to reproduce a data signal in substantially the same form as originally supplied. A predetermined probe signal is transmitted through the data link along with the data and is compared at the receiver end with what it should be for adjusting the equalizing "inverse filter."

Figure 1:
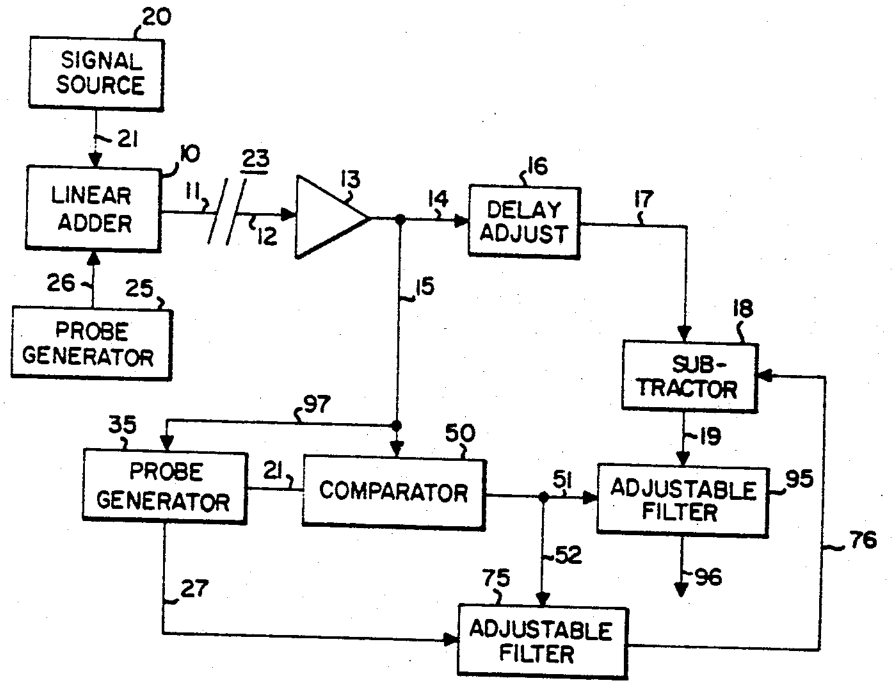

This invention relates generally to communications apparatus and is more particularly directed to a method and apparatus for automatically, or adaptively, providing equalization for undesirable data link transfer characteristics.

In the prior art with which my invention is concerned, equalization for static and dynamic transfer characteristics of data links has been the subject of a great deal of intensive research for methods and apparatus that will allow the use of present data links at a rate substantially faster than that presently allowable. On one hand, improvement in the data link itself might be effected to allow the transmission of data at higher rates than now used. Investigation in this general area has indicated that it would be difficult and expensive to provide data links having improved and consistent transfer characteristics. One of the commonly used methods for equalization of a data link has been to measure, by suitable means, the transfer characteristics of a data link and then provide filters which will compensate for the static transfer characteristics of the data link. It is known, however, that the transfer characteristics of a data link may vary considerably with time and, under actual operating conditions, static equalization may provide little or no improvement. This unfortunate fact has resulted in the necessity for a reduction of the signalling rate in a channel so as to insure the accurate transmission of information through the data link.

My invention is directed to the solution of the equalization problem associated with the undesirable nonstationary, or time varying, transfer characteristic of a data link as might be exemplified in high frequency radio communication. The undesirable static transfer characteristics of a data link are equally well equalized. Briefly, my method and apparatus provides a source of "probe" signal having pre-determined characteristics at the transmitter in a data system and a second source of "probe" signal, having the same characteristics, at the receiver in a data system. The first and second signals are maintained in synchronization through suitable means. The first signal is transmitted through the system and is compared, at the receiver, with the second signal to provide a measurement, or indication, of the transfer characteristic of the channel through which the first signal has been transmitted. An adjustable filter, designed to be operative in response to a signal related to the received "probe" signal and the "probe" signal provided at the receiver, is continually adjusted in accordance with the relationship between the two "probe" signals to provide equalization for the transfer characteristics of the data link with respect to any signals being transmitted therethrough. By providing equalization in this manner, the rate of transmission of data may be substantially increased over presently known forms of prior art methods and apparatus relating to data handling systems.

It is, therefore, an object of my invention to provide a novel and improved method of equalizing a data link.

A further object of my invention is to provide novel and improved apparatus for adaptively equalizing a data link.

Another object of my invention is to provide data link equalization apparatus that may be operative simultaneously with the transmission of information data through a data link.

A still further object of my invention is to provide novel and improved apparatus for equalization of the transfer characteristics of a data link, which is responsive to the impulse response of a data handling system to provide a filter that is matched to the data link transfer characteristics.

Figure 2:
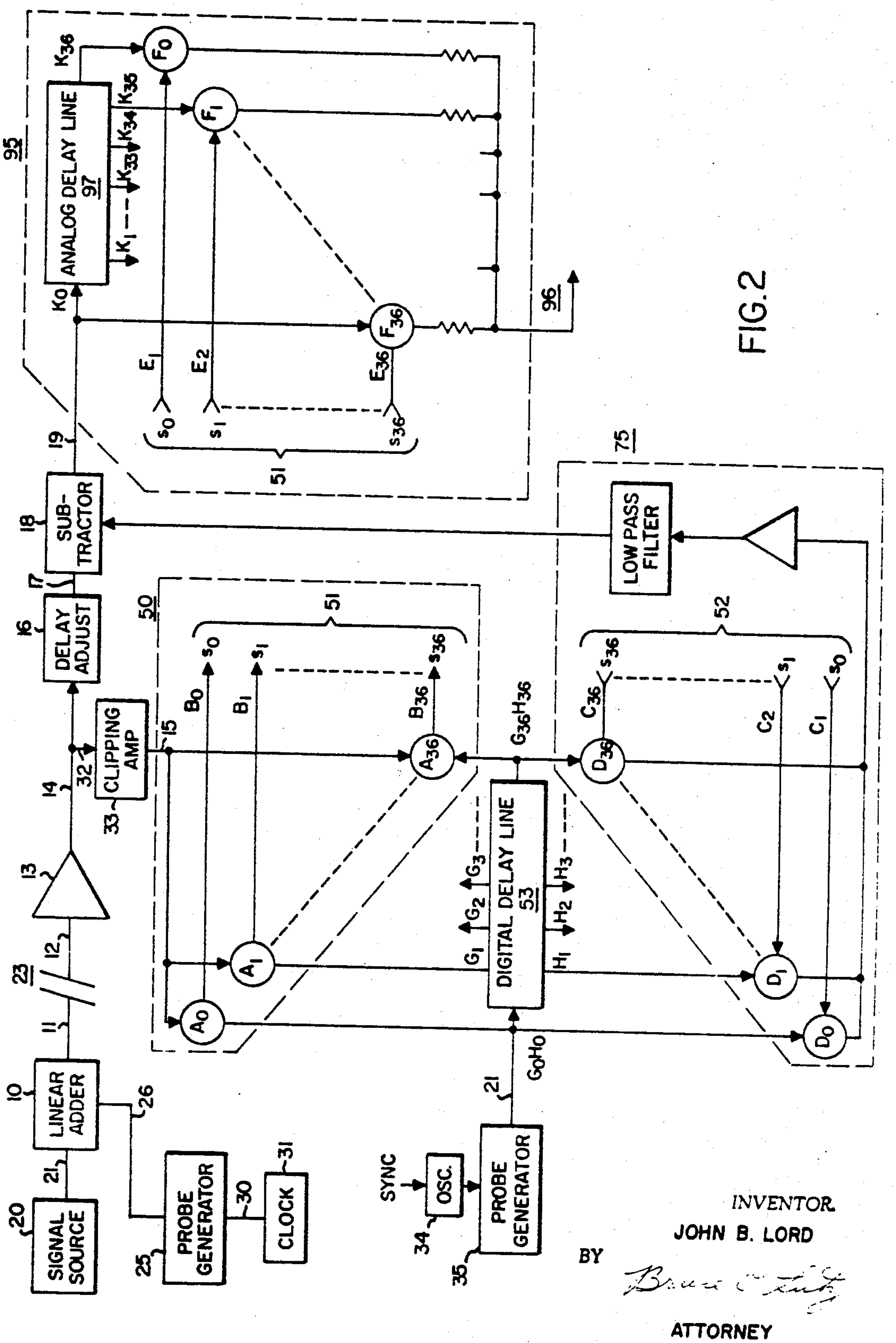

These and other objects of my invention will become apparent from a consideration of the appended specification, claims, and drawing in which:

FIGURE 1 is a block diagrammatic showing of the general form of my invention; and FIGURE 2 is a composite drawing of one embodiment, shown in schematic and diagrammatic form, of my invention as applied to a typical data handling system.

It may be noted at this point that like elements on the several views of the drawings have been identified by like reference characters.

Referring now to FIGURE 1 of the drawings, there is shown a linear adder 10, energized from a source of signal 20 through conductor 21 and from a probe generator 25 through conductor 26. Linear adder 10 is connected to a data link indicated generally by reference character 23 through conductor 11. Data link 23 may be, for example, a high frequency radio link. The data link includes any required modulation/demodulation processes along with any necessary transmitting and receiving apparatus. The only restriction on data link 23 is that it be equivalent to a linear, though possibly time varying, transfer characteristic. Data link 23 is shown connected to an input conductor 12 which may comprise the input to a data signal receiver. The signal appearing on conductor 12 has normally been affected by the transfer characteristics of the data link and, in accordance with the necessity for equalization to compensate for the undesirable transfer characteristics of the data link, a filter 95 is provided to equalize an information signal appearing on conductor 12 to provide a satisfactory output signal on output conductor 96 connected to suitable signal utilization means (not shown).

It may be seen that a plurality of cooperating elements are disposed intermediate input conductor 12 and output conductor 96. These elements include an amplifier 13, an adjustable delay means 16, a subtractor 18, a probe generator 35, a compartor 50, and adjustable filters 75 and 95. Amplifier 13 is shown connected to input conductor 12 and the output thereof is shown connected to delay means 16 through conductor 14, to comparator 50 through conductor 15 and to probe generator 35 through conductor 97. Delay means 16 is connected to subtractor 18 through conductor 17 and the output of subtractor 18 is connected to adjustable filter 95 through conductor 19. Comparator 50 is shown connected to receive a signal from probe generator 35 through conductor 21 and is further connected to adjustable filters 95 and 75 through a plurality of conductors 51 and 52 respectively. Adjustable filter 75 is shown connected to receive a signal from probe generator 35 through conductor 27 and to supply a signal to subtractor 18 through conductor 76

In FIGURE 1, linear adder 10 is operative to combine the outputs of signal source 20, which may be a source of information data, and probe generator 25, which may be a source of pseudo-random coded binary signal that may be characterized in a particular that may easily be determined by one skilled in the art.

Operation of FIGURE 1

In the general system embodying the principles of my invention shown in FIGURE 1, the impulse response of the data link is continuously measured by comparing, or correlating, the signal supplied from probe generator 25 through linear adder 10 and data link 23, to comparator 50, with the locally, independently generated probe signal from probe generator 35 which has been suitably synchronized with the signal supplied from probe generator 25. The output of comparator 50 is a plurality of signals appearing on the plurality of connections 51 and 52 which are related to the impulse response of the data link. The signals are derived by correlating the received composite signal, appearing on conductor 15, with a plurality of delayed versions of the locally generated signal from probe generator 35. The total number of the plurality of delayed versions of the locally generated signal from probe generator 35 involved in the plurality of correlations effected by comparator 50 is ascertained by consideration of the effective frequency bandwidth of the data link 23 and the maximum expected time duration of the significant portion of the impulse response of said data link 23. The plurality of signals produced by comparator 50 are utilized to control the operation of adjustable filters 75 and 95.

Adjustable filter 75 is operative to modify the output of probe generator 35 so as to provide a locally generated replica of the received signal from probe generator 25. The signal is applied to subtractor 18 wherein the received probe signal is removed from the composite signal that may be present on conductor 17 at the input to subtractor 18 whereby only the received signal corresponding to that provided by signal source 20, or the like, is present on conductor 19.

Filter 95 is continuously adjusted to match the dynamic impulse response of the data link and the equalized information signal received from signal source 20 will appear on output conductor 96 for further processing by suitable apparatus (not shown).

Referring now to FIGURE 2, there is shown an illustrative embodiment of apparatus incorporating the principles of my invention which may be operative in accordance with the general operation described above.

In the drawing, there is shown a signal source 20 that is connected to a linear adder 10 through conductor 21 and a probe generator 25 that is energized from a clock 31 through conductor 30 and which is connected to linear adder 10 through conductor 26. The output of linear adder 10 is connected to output conductor 11 that is in turn connected to a data link indicated generally be reference character 23. Conductor 12 is shown connected to an amplifier 13 which is in turn connected to an adjustable delay means 16 through conductor 14 and to comparator 50 through conductor 32, a clipping amplifier 33 and conductor 15. Delay means 16 is connected to one input of subtractor 18 through conductor 17 and the output of subtractor 18 appears on conductor 19 which is connected to an input terminal $K_0$ on analog delay line 97 which is shown having a plurality of taps represented by reference characters $K_0$ to $K_{36}$, for example. The indicated taps on analog delay line 97 are connected to output conductor 96 through a like, corresponding, plurality of four quadrant multipliers $F_0$ to $F_{36}$, for example. The four quadrant multipliers, $F_0$ to $F_{36}$, and a like plurality of summing resistors are connected intermediate corresponding taps $K_0$ to $K_{36}$ on analog delay line 97 and output conductor 96 to define an adjustable filter 95 which may be matched, through controlling signals to the individual four quadrant multipliers $F_0$ to $F_{36}$, to the impulse response of the data link.

Comparator 50 is shown having a plurality of correlators $A_0$ to $A_{36}$ that are connected intermediate corresponding terminals $G_0$ to $G_{36}$ on digital delay line 53 and conductor 15. In the example shown, each correlator ($A_0$ to $A_{36}$) is a "clipper correlator" consisting of digital logic performing "exclusive or" or "modulo-two" addition, followed by respective low pass filters to provide integration. A like plurality of conductors $B_0$ to $B_{36}$ are shown connected to the outputs of corresponding correlators $A_0$ to $A_{36}$ and the individual outputs of the conductors may conveniently be handled in a cable indicated by reference character 51 that is in turn connected respectively to conductors $E_0$ to $E_{36}$ on adjustable filter 95 and to conductor 52 connected respectively to conductors $C_0$ to $C_{36}$ in adjustable filter 75. The plurality of signals $S_0$ to $S_{36}$ appearing on conductors $B_0$ to $B_{36}$ are connected to the plurality of conductors $E_0$ to $E_{36}$ in such a manner as to control multipliers $F_0$ to $F_{36}$ so that analog delay line 97, multipliers $F_0$ to $F_{36}$ and the corresponding plurality of summing resistors produce a filter matched to the transfer characteristic of data link 23.

Adjustable filter 75 is shown comprised of a plurality of four quadrant multipliers $D_0$ to $D_{36}$, each having one input connected respectively to conductors $C_0$ to $C_{36}$. Four quadrant multipliers $D_0$ to $D_{36}$ and a like plurality of summing resistors are shown connected intermediate corresponding terminals $H_0$ to $H_{36}$ on delay line 53 and conductor 80. Conductor 80 is connected to subtractor 18 through amplifier 77, conductor 78, low pass filter 79 and conductor 76.

Operation of FIGURF 2

For the configuration shown in FIGURE 2, signal source 20 and probe generator 25 are operative to provide input signals to linear adder 10 which in turn provides a composite signal containing information data and the probe signal which has been suitably characterized, for example, according to a pseudo-random binary code and is of a predetermined frequency controlled by clock 31. A signal is transmitted through the data link 23 and appears on an input conductor 12 that may be, for example, the output of a radio receiver in a high frequency communication system. The composite signal is amplified by amplifier 13 and applied to conductor 15 through clipping amplifier 33 and conductor 32. A mode of synchronization is not included as part of the invention but the following technique is included to illustrate one method.

Probe generator 35 is identical to probe generator 25 and is under control of oscillator 34, which is in turn under the control of a synchronization signal not included as a part of this invention.

Once synchronization has been attained, correlation between the probe signal present on conductor 15 and the locally generated probe signal present in digital delay line 53 may be accomplished and voltages appearing at the outputs of conductors $B_0$ to $B_{36}$ define the impulse response of the data link 23. The total time of digital delay line 53 may be chosen to be greater than the maximum predicated multipath or impulse response due to the transfer characteristics of the data link and the individual increment of time delay chosen to be consistent with the required bandwidth.

The individual components present in the output of comparator 50 are connected to corresponding multipliers in filters 75 and 95 to provide suitable output signals in accordance with impulse response of the data link 23. Adjustable filter 75 is operative to modify the locally generated probe signal supplied by probe generator 35 in accordance with the impulse response of the data link so as to produce a replica of the probe portion of the composite signal appearing on conductor 14. The composite signal appearing on conductor 14 is suitably delayed in delay means 16 so that the output of filter 75 may be subtracted to provide only the information data signal on conductor 19 which is then applied to input terminal $K_0$ on analog delay line 97 in adjustable filter 95 for filtering in accordance with a filter matched to the impulse response of the data link.

Variations in the impulse response of the channel result in continuing variation in the outputs appearing on conductors $B_0$ to $B_{36}$ to provide a corresponding variation in the inputs to multipliers $D_0$ to $D_{36}$ and $F_0$ to $F_{36}$ whereby filters 75 and 95 may be continuously adjusted to the dynamic impulse response of the data link.

While it is believed that my invention may readily be practiced by one skilled in the art of digital communication and the like, brief descriptions of several of the components for one embodiment of the invention will be set forth below.

Clock 31 may be a stable oscillator operative at 7.2 kilocycles. Oscillator 34 may be any suitable voltage controlled oscillator having a nominal frequency of 7.2 kilocycles. Probe generators 25 and 35 may include a 7-stage shift register operative to produce a pseudo-random binary signal. Analog delay line 97 is shown as having 35 tapes separated by a time increment $\Delta T$ and may have a total time delay of 5 milliseconds and a 3 kilocycle bandwidth. Digital delay line 53 may be comprised of a 36 stage shift register which provides a like time spacing $\Delta T$ between adjacent output terminals. Correlators $A_0$ to $A_{36}$ may be comprised of "exclusive or" gates and low pass filters.

I claim:

1. In combination with a data link having an associated sending end and receiving end;
   (a) a data signal associated with the sending end;
   (b) a first source of characterized signal associated with said sending end;
   (c) means for combining the data signal and the first source of characterized signal;
   (d) means associated with said receiving end for providing a second source of characterized signal;
   (e) means, including delay means and a plurality of multiplying means associated with said receiving end for comparing a received signal corresponding to the combined said data signal and said first source of characterized signal, and said second source of characterized signal to provide a third source of signal indicative of any difference between said first source of characterized signal as modified by the data link and said second source of characterized signal; and
   (f) signal responsive adjustable filter means connected to the output of said receiving end and said third source of signal, said filter means being operative and responsive to said third signal to provide dynamic equalization for the transfer characteristics of said data link interconnecting said sending end and said receiving end to allow recovery of said data signal.

2. The method of equalizing a data handling system which comprises the steps of:
   (a) providing a first source of signal to be combined with a data signal and to be transmitted through a data link;
   (b) transmitting said combined signal through a data link;
   (c) providing a second source of signal at the receiving end of a data link, said second signal having characteristics like that of said first source of signal;
   (d) receiving said signal at the receiving end of said data link;
   (e) comparing the received signal with the second signal to provide a third resultant signal;
   (f) providing a further signal having characteristics like the received first signal and subtracting said further signal from the received first signal;
   (g) providing an adjustable filter; and
   (h) adjusting said filter in accordance with said third signal to provide equalization of the data transfer characteristics of said data link.

3. In combination with a data link having an associated sending end and receiving end:
   (a) a data signal associated with the sending end;
   (b) a first source of characterized signal associated with said sending end;
   (c) means for combining the data signal and the first source of characterized signal;
   (d) means associated with said receiving end for providing a second source of characterized signal;
   (e) means associated with said receiving end for comparing a received signal corresponding to the combined said data signal and said first source of characterized signal with said second source of characterized signal for providing a third source of signal indicative of any difference between said first source of characterized signal as modified by the data link and said second source of characterized signal; and
   (f) signal responsive adjustable filter means connected to the output of said receiving end and said third source of signal, said filter means including a delay line and a plurality of multiplying means wherein said multiplying means are connected to a plurality of taps on said delay line and further connected to receive said third source of signal, said filter means being operatively responsive to said third signal to provide dynamic equalization of the transferred characteristics of said data link interconnecting said sending end and said receiving end for recovery of said data signal.

4. In combination with a data link having an associated sending end and receiving end:
   (a) a data signal associated with the sending end;
   (b) a first source of characterized signal associated with said sending end;
   (c) means for combining the data signal and the first source of characterized signal to produce one composite signal to be sent;
   (d) means associated with said receiving end for providing a second source of characterized signal;
   (e) means associated with said receiving end for comparing a received signal corresponding to the composite signal, with said second source of characterized signal to provide a third source of signal indicative of any difference between said first source of characterized signal as modified by the data link and said second source of characterized signal;
   (f) first signal responsive adjustable filter means connected to the output of said receiving end and said third source of signal, said filter means being operative and responsive to said third signal to provide dynamic equalization for the transfer characteristics of said data link interconnecting said sending end and said receiving end to allow recovery of said data signal;
   (g) second signal responsive adjustable filter means connected to said second source of characterized signal and said third source of signal for providing a fourth signal directly related to the first source of characterized signal as modified by the data link; and
   (h) signal subtracting means associated with said receiving end and said first filter means where said subtracting means uses said fourth signal to remove the first characterized signal as modified by the data link from the received signal and yields only said data signal as modified by the data link to said first filter means.

5. The method of equalizing a data handling system which comprises the steps of:
   (a) providing a first source of signal to be combined with a data signal and to be transmitted through a data link;

(b) transmitting said combined signal through a data link;

(c) providing a second source of signal at the receiving end of a data link, said second signal having characteristics like that of said first source of signal;

(d) receiving said signal at the receiving end of said data link;

(e) comparing the received signal with the second signal to provide a third resultant signal;

(f) providing a further signal having characteristics like the received first signal and combining said further signal with the received signal to yield a signal indicative of the original data signal;

(g) providing an adjustable filter; and (h) adjusting said filter in accordance with said third signal to provide equalization of the data transfer characteristics of said data link.

References Cited

UNITED STATES PATENTS

| | | | |
|---|---|---|---|
| 2,692,307 | 10/1954 | Ketchledge | 179—175.3 |
| 2,924,703 | 2/1960 | Sichak et al. | 325—31 |
| 2,963,549 | 12/1960 | Christopherson | 178—69 |

THOMAS A. ROBINSON, *Primary Examiner.*

U.S. Cl. X.R.

179—175.3; 325—31